Patented Dec. 29, 1936

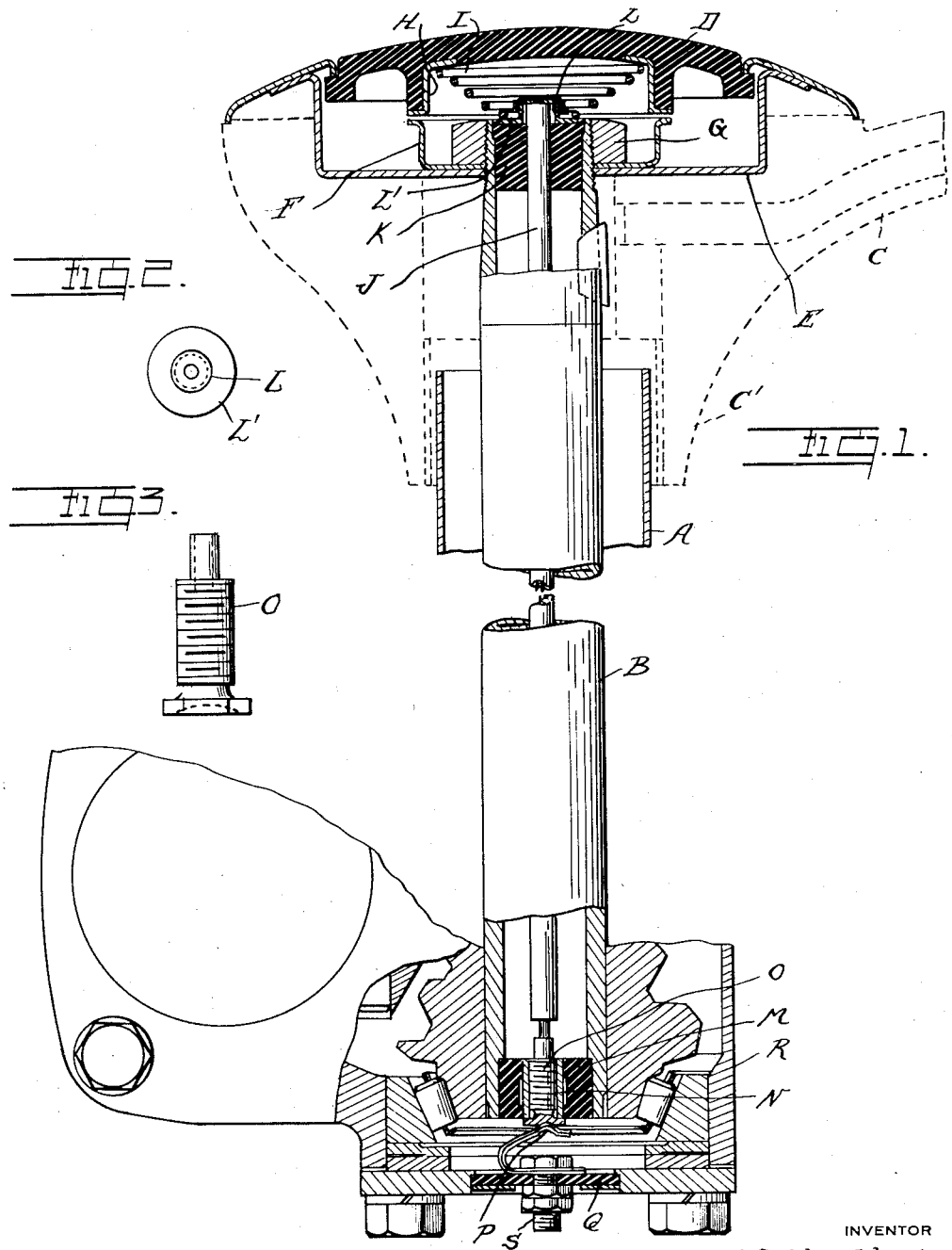

2,065,611

UNITED STATES PATENT OFFICE 2,065,611

STEERING MECHANISM

Harper E. Pulleyblank, Detroit, Mich., assignor to Gemmer Manufacturing Company, Detroit, Mich., a corporation of Michigan Application April 25, 1934, Serial No. 722,395

4 Claims. (Cl. 173—324)

The invention relates to motor vehicle steering mechanism and more particularly to the horn or signal operating means which is associated with the steering column. Among the objects of the invention are, first, to obtain a construction which avoids the twisting or flexing of the electrical conductor that passes through the steering column and which frequently results in the breaking of the circuit. It is a further object to obtain a lubricant seal which precludes the passage of oil through the column and the leakage of the same around the switch button. With these objects in view the invention consists in the construction as hereinafter set forth.

In the drawing:

Fig. 1 is a longitudinal section through a portion of the steering column of a steering mechanism showing my improvements applied thereto.

Fig. 2 is a plan view of the cap for the upper end of the electrical conductor;

Fig. 3 is an elevation of the screw threaded plug forming the connection to the lower end of the electrical conductor.

My improvements are applicable to standard constructions of motor vehicle steering mechanisms comprising a hollow post A, a tubular steering column B, a steering wheel C mounted on the upper end of said column and having a hub portion C' surrounding the upper end of the post, and a horn operating switch D mounted on the wheel at the center thereof. It is usual to electrically connect the switch D with the horn by a conductor which passes through the tubular steering column and thence to the horn. Inasmuch, however, as this steering column is constantly being turned, carrying the switch with it, this will impart a twisting movement to the conductor which in course of time may be so weakened as to break. Another objection to constructions as usually made is that the tubular column forms an open passageway between the lubricated mechanism at the lower end thereof and the switch at the top. In the normal position of the car that might not be objectionable, but where the steering column is greatly inclined, as with some makes of cars and where the forward wheels of the car are higher than the rear wheels, as in a steep grade, lubricant may flow through the column and switch and leak out upon the upholstery of the car. Furthermore, it is quite common practice in the shipment of cars to arrange the same on the transport at an oblique angle which permits the leakage of lubricant as just described.

To overcome the objections above referred to, I have devised a construction of electrical connections between the switch and the horn which avoids any twisting or objectionable stressing of the conductor passing through the hollow column. I have further devised a means for sealing the passage through the tubular stem so as to preclude the flow of oil therethrough, the construction being as follows: E is the cupped switch casing which is mounted upon the upper end of the steering column B and which carries the grounded electrode or contact F of the switch. These parts are secured to the column by a nut G engaging the threaded upper end thereof. The button D carries a movable annular contact member H which is normally held separate from the contact F by a spring I. This spring is of a conical spiral form and also serves as the electrical connection between the contact H as the conductor J passes through the steering column.

This conductor is preferably formed of insulated wire and passes through and is secured to a plug K which is inserted in the upper end of the tubular column. The plug is preferably formed of fiber or other suitable insulating material and constitutes an effective cap or seal for the column. The end of the conductor J is soldered or otherwise electrically connected to a metallic cap L which has an outwardly extending flange L' bearing on the top face of the plug and forming an abutment for the lower end of the spring I. Thus an electrical connection is effected between the contact F and the conductor J. In the lower end of the column B is inserted another plug M which forms a cap or seal and is also an insulator. Centrally within this plug is a bushing N which is internally threaded to engage a screw O. The inner end of this screw has a socket therein for receiving the end of the conductor J while the head of the screw forms a contact member engaging a cooperating spring contact P. The latter is mounted on an insulator plug Q in the housing R of the steering gear and is connected with a terminal post S for attachment of the conductor leading to the horn.

With the construction as described, the turning of the steering wheel C and column B will carry with it the switch D and conductor J without any relative movement between these parts. At the lower end of the column the contact formed by the head of the screw O will turn with the column but will maintain electrical connection with the non-revolvable spring contact P. Thus the current will be conveyed between the horn and switch without any twisting or flexing of the conductors. Also the plugs K and M completely close the upper and lower ends of the tubular column B so as to prevent passage of lubricant therethrough.

For convenience in assembling the conductor J may be first attached to the plug M when removed from the bushing N. The wire may be then threaded through the bushing and through the aperture in the upper plug K, there being sufficient slack to permit of drawing the end portion out from the plug and for attaching the cap L thereto. The conductor can then be forced back through the plug, resting the flange L' thereon and holding it in this position by the spring I.

What I claim as my invention is:

1. In a steering mechanism, including a tubular steering column, plugs for closing the upper and lower ends of said column centrally apertured, the aperture of the lower plug being of greater diameter, an insulated electrical conductor passing through said column and apertures in said plugs, a contact member electrically connected to the lower end of said conductor and having a threaded engagement with said plug to secure the same thereto and to seal the plug, a cap for embracing the upper end of said conductor and soldered thereto, said cap having a flange for supporting the same on said plug and a stationary contact at the lower end of said column resiliently pressed against the contact in said plug.

2. In a steering mechanism, including a tubular steering column, insulator plugs for closing the upper and lower ends of said columns, an insulated electrical conductor passing through said column and apertures in said plugs, the insulation of said conductor fitting the aperture in the upper plug, a cap secured to the upper end of said conductor and resting upon said plug, a threaded bushing in the lower plug of an internal diameter greater than said insulated conductor to permit of easy insertion of the latter through said plug, a contact member having a threaded shank for engaging said bushing and connected to the lower end of said conductor, said contact being removable from said bushing to permit of the insertion of said conductor through the same and through the column, and a spring contact member mounted below said column and pressing against the lower end of said plug contact.

3. In a steering mechanism, including a tubular steering column, plugs for closing the upper and lower ends of said column, each centrally apertured and the aperture of the lower plug being of greater diameter, an insulated electrical conductor passing through said column and the apertures in said plugs, a contact member fixedly secured to the lower end of said conductor and having a threaded engagement with the lower plug to form a lubricant sealing engagement therewith, and a cap having a portion for fitting the upper end of said conductor and soldered thereto, said cap having a flange for supporting the same on the plug.

4. In a steering mechanism, including a tubular steering column, plugs for closing the upper and lower ends of said column, said plugs being centrally apertured and the aperture in the lower plug being of greater diameter, an insulated electrical conductor freely insertable through the aperture in the lower plug and fitting the aperture in the upper plug with a portion projecting above said plug, a cap for embracing the projecting portion of said insulated conductor and soldered to the metallic conductor thereof, said cap having a flange for supporting the same on said plug, a contact member for closing the aperture in the lower plug being recessed to engage the lower end of said insulated conductor and a stationary contact member below said column resiliently pressed against said plug contact member.

HARPER E. PULLEYBLANK.